United States Patent
Warnez et al.

(10) Patent No.: US 6,345,837 B1
(45) Date of Patent: Feb. 12, 2002

(54) PASSENGER SIDE AIR BAG MODULE

(75) Inventors: Michael A. Warnez; Glenn F. Syrowik, both of Ortonville; Hisham Amaral, West Bloomfield, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/186,982

(22) Filed: Nov. 5, 1998

(51) Int. Cl.[7] .............................................. B60R 21/20
(52) U.S. Cl. ..................... 280/728.3; 280/752
(58) Field of Search ............................ 280/728.2, 732, 280/728.3, 741, 752, 730.2

(56) References Cited

U.S. PATENT DOCUMENTS

| | | | | |
|---|---|---|---|---|
| 3,778,085 A | * | 12/1973 | Lipkin ..................... | 280/728.3 |
| 4,895,389 A | | 1/1990 | Pack, Jr. | |
| 5,217,249 A | | 6/1993 | Kokeguchi | |
| 5,263,739 A | | 11/1993 | Webber et al. | |
| 5,340,151 A | | 8/1994 | Sato | |
| 5,342,085 A | * | 8/1994 | Hirashima et al. ....... | 280/728.3 |
| 5,346,248 A | | 9/1994 | Rhein et al. | |
| 5,364,125 A | | 11/1994 | Brown et al. | |
| 5,398,960 A | | 3/1995 | Ravenberg et al. | |
| 5,407,226 A | | 4/1995 | Lauritzen et al. | |
| 5,425,550 A | * | 6/1995 | Paxton et al. ............. | 280/728.3 |
| 5,431,433 A | * | 7/1995 | Steimke et al. .......... | 280/728.3 |
| 5,431,435 A | * | 7/1995 | Wilson ..................... | 280/728.2 |
| 5,439,248 A | | 8/1995 | Steffens, Jr. et al. | |
| 5,470,101 A | * | 11/1995 | Ennis ...................... | 280/728.2 |
| 5,480,183 A | | 1/1996 | Ward et al. | |
| 5,511,819 A | * | 4/1996 | Spilker et al. ............. | 280/732 |
| 5,516,144 A | | 5/1996 | Headley et al. | |
| 5,547,216 A | | 8/1996 | Iwata et al. | |
| 5,573,271 A | | 11/1996 | Headley | |
| 5,588,667 A | * | 12/1996 | Emambakhsh et al. .. | 280/728.2 |
| 5,647,608 A | * | 7/1997 | Damman et al. .......... | 280/732 |
| 5,711,545 A | * | 1/1998 | Wehner .................... | 280/728.3 |
| 5,876,058 A | * | 3/1999 | Nemoto .................... | 280/728.2 |
| 5,887,891 A | * | 3/1999 | Taquchi et al. .......... | 280/728.2 |
| 5,904,367 A | * | 5/1999 | Warnez et al. ............. | 280/732 |
| 5,931,489 A | * | 9/1999 | Damman et al. ........ | 280/728.2 |
| 6,010,146 A | * | 1/2000 | Otsuka et al. ........... | 280/728.3 |
| 6,082,759 A | * | 7/2000 | Faigle et al. ............. | 280/728.3 |

\* cited by examiner

*Primary Examiner*—Kenneth R. Rice
*Assistant Examiner*—Lynda Jasmin
(74) *Attorney, Agent, or Firm*—Mark P. Calcaterra

(57) ABSTRACT

An air bag module which includes a panel member having an integral reaction canister having a plurality of reaction walls and a manifold assembly having a manifold. The manifold includes at least one deployment door retaining channel and is operable for retaining an air bag cushion, an inflator, and a deployment door. The deployment door includes at least one retaining bead and a trim portion which are separated by a pliant spacing leg. As the reaction canister is incorporated into the panel member, the need for a separate reaction canister component is eliminated, thereby reducing cost, weight and overall size of the air bag module and allowing the manifold assembly to be used across a wider range of vehicles. The retaining bead and spacing leg flexibly couple the cover door to the manifold and allow the cover door to be repositioned during installation of the manifold assembly into the panel member so as to eliminate gaps, puckering and other defects in the appearance or the vehicle interior.

14 Claims, 2 Drawing Sheets

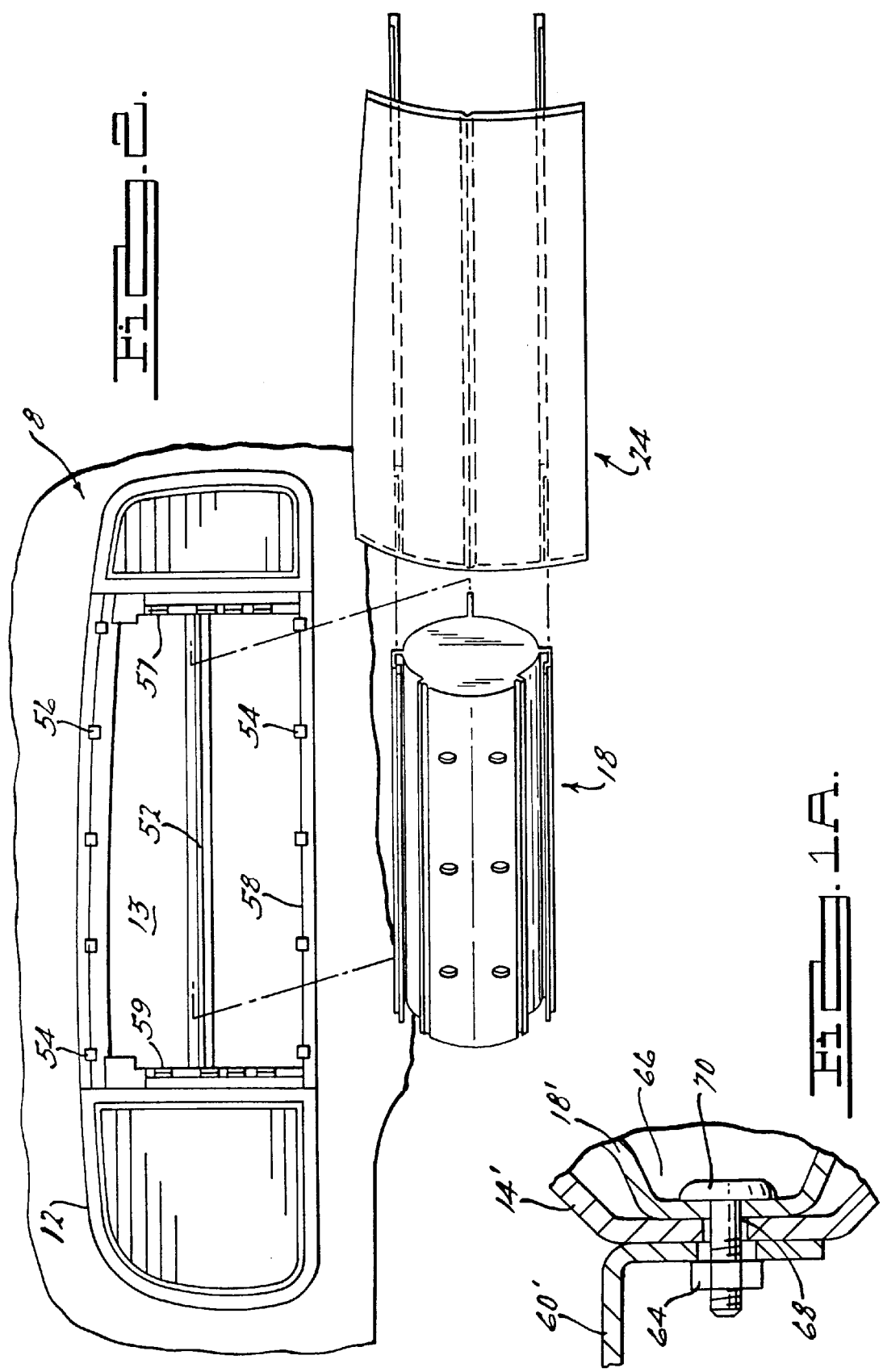

PASSENGER SIDE AIR BAG MODULE

BACKGROUND OF THE INVENTION

1. Technical Field

The present invention relates generally to vehicle air bag modules and more specifically, to an air bag module having a manifold for retaining an inflator which includes at least one integrated deployment door retaining channel and a reaction canister which is integrated into a vehicle panel.

2. Discussion

Modern air bag modules generally include a reaction canister, an inflator, a manifold and an air bag cushion. These modules are typically attached inside a panel to a structural support and hidden from view by a cover door that is attached to either the panel or the reaction canister.

Air bag modules have gained widespread commercial acceptance over the past several years. The modular concept permits the subassembly and stockpiling of the air bag modules for subsequent installation into a vehicle. The module is typically secured to the vehicle with several fasteners, thereby greatly simplifying the process of installing an air bag cushion into a vehicle on a high volume production assembly line. Despite these advantages, the prior art air bag modules have several significant drawbacks.

One such drawback concerns the reaction canister. As a primary function of the reaction canister is to guide the air bag cushion into the passenger compartment during deployment of the air bag module, the geometry of the reaction canister is typically dependent upon the design of the vehicle interior. Consequently, the configuration of an air bag module for one model of vehicles may not be suitable for use in a second model of vehicles.

Another problem concerns the packaging of the module into the panel. In order to improve the ability to assemble to module and eliminate the possibility of interference between the module and the corresponding panel, the aperture or recess into which the module was mounted was frequently larger than necessary. This inefficiency could sometimes render the process of incorporating the air bag module into a vehicle more difficult, particularly where other components or storage areas are located in close proximity. For example, where a prior art module was mounted into an instrument panel on the passenger side of a vehicle, the size of the aperture in the panel required for installation of the reaction canister was usually such that a down-sizing of the glove compartment was necessary.

A further problem is the impact of the numerous amount of components that either comprise or are related to the module. In addition to considerations about the costs of tooling, fabrication and subassembly labor, tolerances associated with the numerous individual components often stacks-up causing issues with the appearance of the vehicle interior. Tolerance stack-up, caused by variances in the size and/or position of the various characteristics of the individual components, often causes the cover door to be out of position relative to the aperture in the panel which houses the module. This condition is typically manifested through uneven gaps along the edges of the cover door, puckering and other defects in the appearance of the interior. While stack-up had no effect on the functionality of the air bag cushion, the "fit and finish" of the interior would influence vehicle owners and occupants in a negative manner, making it more likely for the vehicle owner to complain to the vehicle dealer and to attribute a lack of quality to the vehicle generally.

Consequently, there remains a need in the art for a simplified air bag module design which reduces the number of components that are associated with the module, which provides a modular design which can be easily integrated into a wide range of vehicles, which reduces the cost, size and weight of the module, and which substantially improves the fit and finish of the vehicle interior.

SUMMARY OF THE INVENTION

It is therefore a general object to provide an air bag module which reduces the number of components that are included or associated with the module.

It is another object of the present invention to provide an air bag module which can be easily integrated into several vehicle models.

It is a further object of the present invention to provide an air bag module which reduces the cost, size and weight of the air bag module.

It is yet another object of the present invention to provide an air bag module which can improve the fit and finish of the vehicle interior.

The air bag module of the preferred embodiment of the present invention includes a panel member having an integral reaction canister and a manifold assembly. The manifold assembly includes a manifold, an inflator, an air bag cushion and a deployment door. The manifold includes at least one deployment door retaining channel and is operable for retaining the air bag cushion, the inflator and the deployment door. The deployment door includes a retaining bead and a trim portion which are separated by a spacing leg. The reaction canister includes at least one manifold assembly mounting aperture, at least one cover door retaining aperture, and a plurality of reaction walls which are operable for guiding the air bag cushion into the passenger compartment during deployment.

As the reaction canister is incorporated into the panel member, the need for a separate reaction canister component is eliminated, thereby reducing the cost, weight and overall size of the air bag module. Similarly, as the panel member is unique to each vehicle, the manifold assembly can now be used across a wider range of vehicles. The retaining bead and spacing leg flexibly couple the cover door to the manifold and allow the cover door to be repositioned during installation of the manifold assembly into the panel member so as to eliminate gaps, puckering and other defects in the appearance of the vehicle interior.

Additional advantages and features of the present invention will become apparent from the subsequent description and the appended claims, taken in conjunction with the accompanying drawings.

BRIEF DESCRIPTION OF THE DRAWINGS

FIG. 1A is a partial cross-sectional view of an air bag module showing an alternate method for securing the manifold to the vehicle.

FIG. 2 is an exploded perspective view of a portion of the air bag module according to a first embodiment of the present invention.

DETAILED DESCRIPTION OF THE PREFERRED EMBODIMENT

Figure 1:
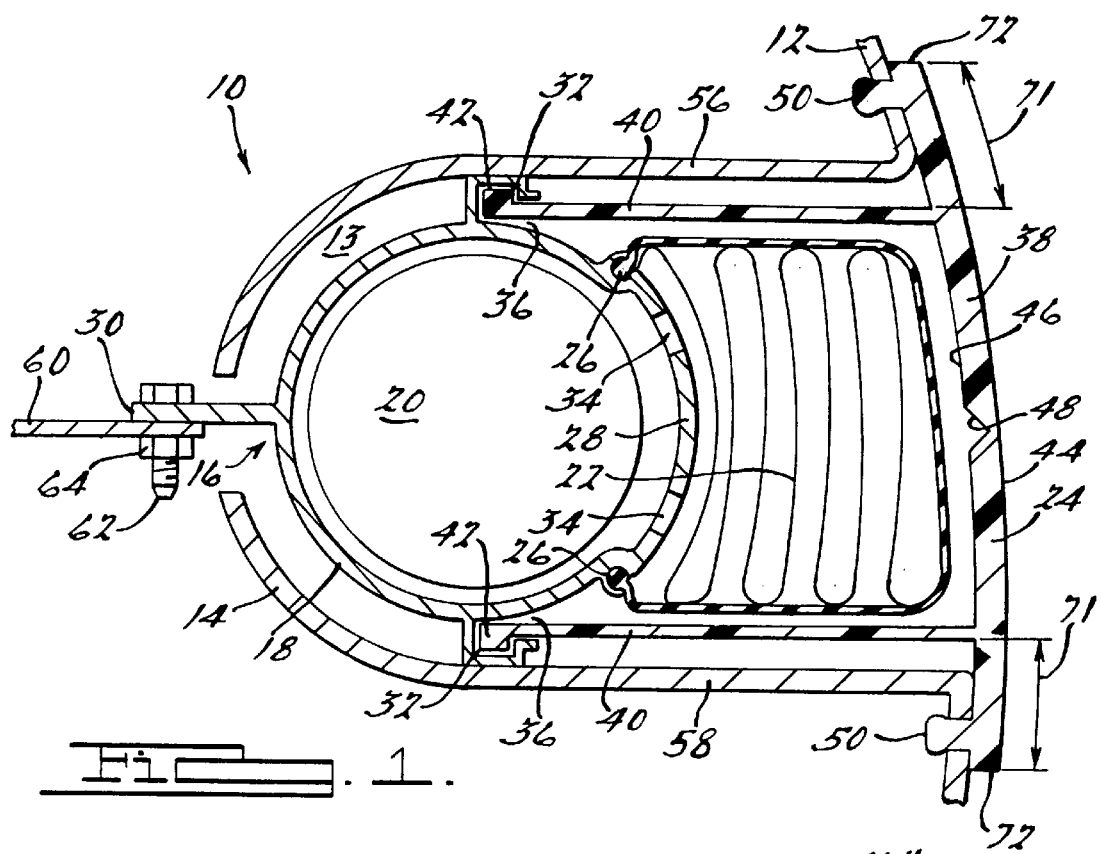
FIG. 1 is a cross-sectional view of an air bag module constructed according to a first embodiment of the present invention.

FIGS. 1 & 2 illustrate an air bag module 10 constructed in accordance with the teachings of the present invention. In the example shown, air bag module 10 has been incorporated into an instrument panel 12 situated at the front passenger side of a vehicle. It should be appreciated that the air bag module shown and its incorporation into an instrument panel is merely exemplary and is not intended to be limiting in any manner. Therefore, it is within the scope of the present invention to incorporate similarly constructed air bag modules into other vehicle panels, including doors, through the teachings disclosed herein.

Air bag module 10 is shown to include a panel-integrated reaction canister 14 and a manifold assembly 16. Manifold assembly 16 is shown to include manifold 18, inflator 20, air bag cushion 22 and deployment door 24.

Manifold 18 is a hollow, generally cylindrically shaped component preferably extruded from a material such as aluminum. Manifold 18 includes attachment preparations 26 for retaining a conventional air bag cushion 22, a venting wall 28, a retaining flange 30 for securing manifold assembly 16 to the vehicle 8, and at least one deployment door retaining channel 32. Inflator 20 is housed within the hollow interior of manifold 18 and retained through conventional means which may include the use of fasteners, press-fitting or end caps. Inflator 20 is otherwise conventional. Venting wall 28 includes a plurality of venting apertures 34 for causing the gas from inflator 20 to be diffused into the open end of air bag cushion 22. Deployment door retaining channels 32 are characterized by a relatively rectangular cross section having a longitudinal slot 36 which extends the length of the manifold.

Deployment door 24 includes trim portion 38, spacing legs 40 and retention beads 42. Trim portion 38 includes an exterior surface 44, an interior surface 46, a tear seam 48 and snap fasteners 50. Spacing legs 40 are operable for extending retention beads 42 away from trim portion 38. Spacing legs 40 provide a strong axial connection between retention beads 42 and trim portion 38, thereby inhibiting axial movement between the two. However, as the cross-section of spacing legs 40 is relatively thin, application of torque or a shear force to the trim portion 38 will cause it to move relative to the retention beads 42. Deployment door 24 is mounted to manifold 18 by inserting retention beads 42 into the corresponding deployment door retaining channels 32 in the manifold 18.

Panel-integrated reaction canister 14 is formed in a recessed cavity 13 in instrument panel 12 and includes at least one manifold assembly mounting aperture 52, at least one trim portion retaining aperture 54, an upper reaction wall 56, a right-side reaction wall 57, a lower reaction wall 58 and a left side reaction wall 59. Reaction walls 56, 57, 58 and 59 are configured to guide air bag cushion 22 out of reaction canister 14 in a desired manner during deployment. Therefore, the number of reaction walls, the geometry of each wall, and, if more than one reaction wall is desired, the manner in which they are coupled together will vary according to numerous design criteria. As such, the figures are not intended to be limiting in this respect.

Manifold assembly 16 is retained within reaction canister 14 by positioning mounting flange 30 though manifold mounting aperture 52 and securing mounting flange 30 to structural bracket 60 with bolts 62 and nuts 64. Alternatively, as shown in FIG. 1A, mounting flange 30 could be eliminated by modifying the geometry of the manifold 18 so as to provide a recessed channel 66 having at least one stud receiving aperture 68 for receiving one or more studs 70. Preferably, studs 70 are retained in recessed channel by press-fitting them into stud receiving apertures 68.

Once manifold assembly 16 has been retained within reaction canister 14, trim portion 38 can then be twisted or moved vertically or laterally within vehicles so as to align snap fasteners 50 with their respective trim portion retaining apertures 54, thereby compensating for component stack-up in these directions. A smaller margin of compensation can be provided for stack-up in an axial direction by forming trim portion 38 with a concave inner surface 46 and spacing apart the snap fasteners 50 from the spacing legs 40. Compensation in the axial direction is then provided by flexing the section of the trim portion 38 between the spacing leg 40 and the corresponding vertical edge 72 of the trim portion 38 to align snap fasteners 50 with their respective trim portion retaining apertures 54.

Upon activation of the air bag module 10, gas discharged from inflator 20 is directed into air bag cushion 22 by venting wall 28 causing air bag cushion 22 to expand. Reaction walls 56, 57, 58 and 59 constrain air bag cushion 22 during inflation causing it to push outwardly against trim portion 38. The pressure exerted by the air bag cushion 22 will cause the trim portion 38 to tear at the tear seam 48, allowing the air bag to deploy into the interior of vehicle 8.

Figure 3:
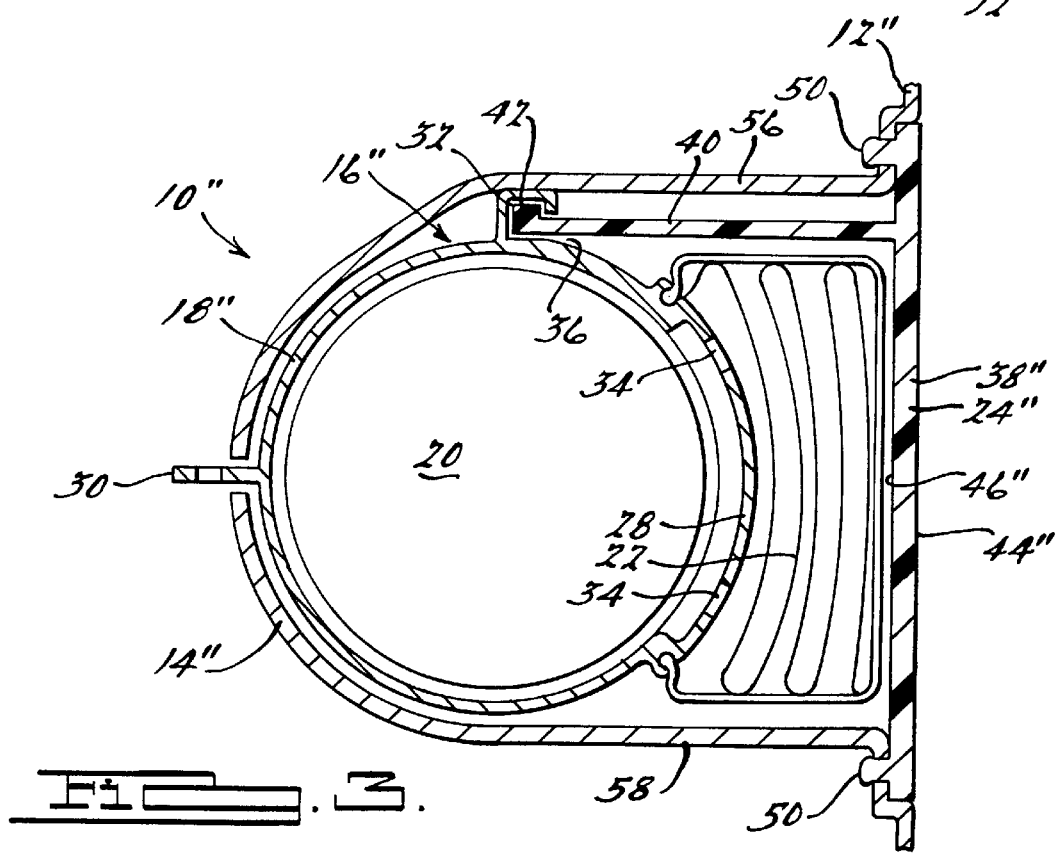
FIG. 3 is a cross-sectional view of an air bag module constructed according to an alternate embodiment of the present invention.

FIG. 3 illustrates an air bag module in accordance with an alternate embodiment of the present invention. Air bag module 10" is similar to the module 10 shown in FIGS. 1 and 2, except that manifold 18" contains only one deployment door retaining channel 32. Configuration in this manner causes the trim portion 38" to flip up during deployment of the air bag cushion 22 rather than tear.

While the invention has been described in the specification and illustrated in the drawings with reference to several embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments following within the description of the appended claims.

What is claimed is:

1. An air bag module for a vehicle comprising:

an inflator;

an air bag cushion;

a panel member having a recessed cavity, said recessed cavity being defined by an end wall that substantially closes a first end of said recessed cavity and a plurality of integrally formed reaction walls for directing said airbag cushion out of said recessed cavity and through a second, open end of said recessed cavity opposite said first end when said air bag module is deployed;

a deployment door fastened to said panel member and having a retaining bead, a trim portion and a pliant spacing leg, said trim portion coupled to a first end of said spacing leg and said retaining bead coupled to a distal end of said spacing leg; and a manifold coupled to said panel member and positioned within said recessed cavity, said manifold having a retaining bead channel for receiving said retaining bead to thereby flexibly couple said manifold and said deployment door together, said manifold housing said inflator and directing a volume of gas therefrom during deployment of said air bag module, said manifold being coupled to an open end of the airbag cushion but not otherwise directing the airbag cushion when the air bag module is deployed.

2. The air bag module of claim 1 wherein said panel member is an instrument panel.

3. The air bag module of claim 1 wherein said panel member is a door panel.

4. The air bag module of claim 1 wherein said retaining bead is engagable with said retaining bead channel solely by longitudinal insertion therein.

5. The air bag module of claim 1 wherein said retaining bead is retained within said retaining bead channel throughout deployment of said air bag module.

6. The air bag module of claim 1 wherein said deployment door is coupled to said panel member with at least one snap-fastener.

7. An air bag module for a vehicle comprising:

an inflator;

an air bag cushion;

a front dash panel having a plurality of trim portion retaining apertures and a recessed cavity, said recessed cavity being defined by an end wall that substantially closes a first end of said recessed cavity and a plurality of integrally-formed reaction walls for directing said air bag cushion out of said recessed cavity and through a second end of said recessed cavity opposite said first end when said air bag module is deployed;

a deployment door having a retaining bead, a pliant spacing leg and a trim portion with a plurality of snap-fasteners, said trim portion coupled to a first end of said spacing leg and said retaining bead coupled to a distal end of said spacing leg, said snap-fasteners engaging said trim portion retaining apertures and coupling said deployment door to said front dash panel; and a manifold coupled to said panel member and positioned within said recessed cavity, said manifold having a retaining bead channel for receiving said retaining bead to thereby flexibly couple said manifold and said deployment door together, said manifold housing said inflator and directing a volume of gas therefrom during deployment of said air bag module, said manifold being coupled to an open end of the airbag cushion but not otherwise directing the airbag cushion when the air bag module is deployed.

8. An air bag module for a vehicle comprising:

a airbag cushion;

a panel member having a recessed cavity, the recessed cavity being defined by an end wall that substantially closes a first end of the recessed cavity and a plurality of integrally formed reaction walls for directing the airbag cushion out of the recessed cavity and through a second end of the recessed cavity opposite the first end when the air bag module is deployed; and a manifold coupled to the panel member and positioned within the recessed cavity, the manifold being coupled to an open end of the airbag cushion but not otherwise directing the airbag cushion when the air bag module is deployed.

9. The air bag module of claim 8, wherein the manifold includes a retaining bead channel.

10. The air bag module of claim 9, further comprising a deployment door coupled to the panel member and having a retaining bead, the retaining bead engaging the retaining bead channel to couple the deployment door to the manifold.

11. The air bag module of claim 10, wherein the deployment door further includes cover member and a pliant spacing leg, the pliant spacing leg coupling the cover member to the retaining bead.

12. The air bag module of claim 9, wherein the retaining bead channel is generally rectangular in cross-section and includes a longitudinal slot extending the length of the manifold.

13. The air bag module of claim 8, wherein the manifold is a one-piece structure having a generally cylindrical shape, the manifold including an inflator holder with a generally circular cross-section, an attachment preparation for retaining the airbag cushion and a venting wall having a plurality of venting apertures.

14. The air bag module of claim 8, wherein the panel member is a dash panel.

* * * * *